July 14, 1925.  
F. W. HECHLER  
1,546,131  
HANDLE FOR COFFEE OR TEA PERCOLATORS, POTS, OR OTHER CULINARY VESSELS  
Filed Dec. 7, 1923
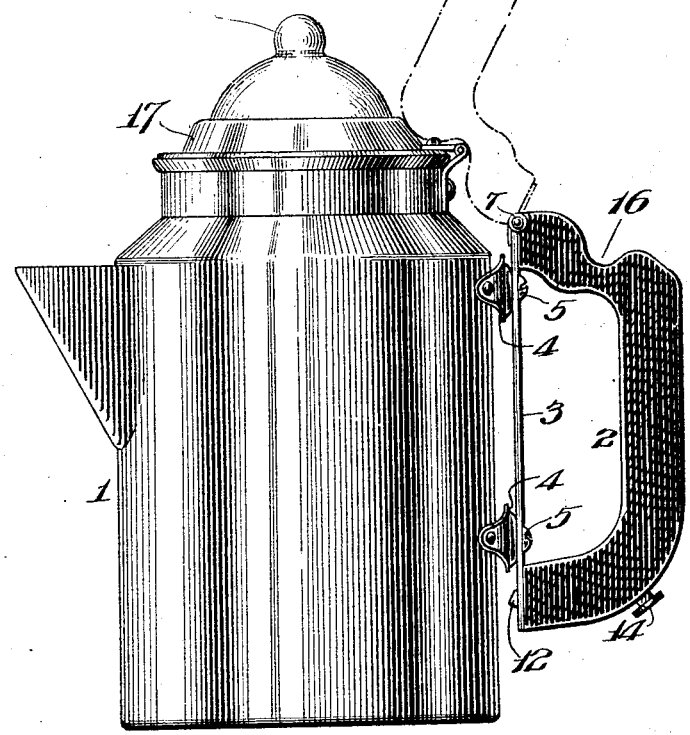
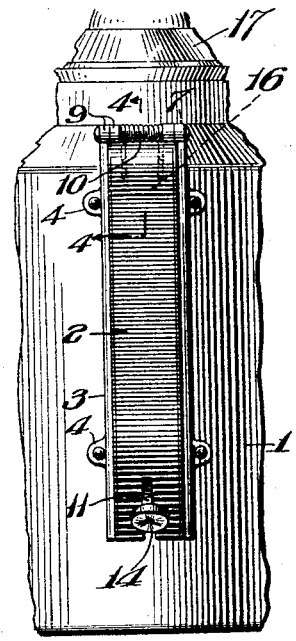
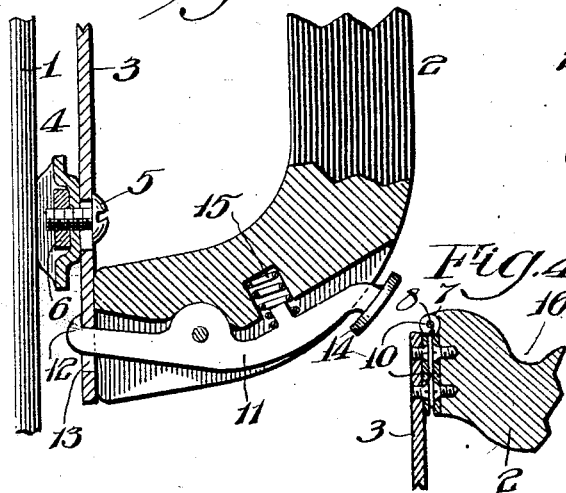
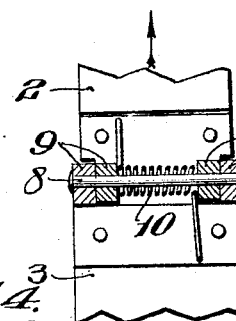
INVENTOR:  
Frederick W. Hechler.  
BY Niederheim & Fairbanks  
ATTORNEYS.

Patented July 14, 1925.

1,546,131

UNITED STATES PATENT OFFICE.

FREDERICK W. HECHLER, OF DARBY, PENNSYLVANIA.

HANDLE FOR COFFEE OR TEA PERCOLATORS, POTS, OR OTHER CULINARY VESSELS.

Application filed December 7, 1923. Serial No. 679,071.

*To all whom it may concern:*

Be it known that I, FREDERICK W. HECHLER, a citizen of the United States, residing at Darby, in the county of Delaware, State of Pennsylvania, have invented a new and useful Handle for Coffee or Tea Percolators, Pots, or Other Culinary Vessels, of which the following is a specification.

My invention relates to a culinary vessel such as a coffee pot, tea pot or the like where the handle thereof is subjected to the heat of a stove, range, etc., and so liable to be loosened from the body of the vessel whereby the body becomes wabbly, loose or disconnected and it is dangerous to be carried.

The invention consists in adapting the handle of such vessel when the vessel is on a stove, range, etc., to be raised and held at an elevation above the top plate of a stove, range, etc., as not to be materially affected by the heat of the latter.

The invention is satisfactorily illustrated in the accompanying drawing, but the important instrumentalities thereof may be varied, and so it is to be understood that the invention is not limited to the specific details shown and described, as long as they are within the scope of the claims.

Figure 1 represents a side elevation of a culinary vessel embodying my invention.

Figure 2 represents a rear elevation of a portion thereof.

Figure 3 represents a vertical section of the lower portion of the handle and adjacent members of the body of the vessel on an enlarged scale.

Figure 4 represents a partial vertical section on line 4—4 Figure 2, and a partial elevation of the adjacent members of the device, on an enlarged scale.

Figure 5 represents a partial vertical section on line 5—5, on an enlarged scale.

Similar numerals of reference indicate corresponding parts in the figures.

Referring to the drawings.

1 designates the body of the vessel in the present case that of a coffee percolator or pot, and 2 designates the handle thereof, both of which excepting the features of my invention applied thereto are of conventional form.

On the rear of said body is the vertically extending bar 3 which is secured firmly thereto by any suitable means, in the present case consisting of the ears 4, screws 5, and the nuts 6, said screws passing through said bar and ears into said nuts, the latter occupying said ears and so being retained therein, as most plainly shown in Figure 3.

To the upper end of the bar 3 and that of the handle 2 are secured respectively the leaves of the hinge 7 by which provision the handle may be elevated turning on said hinge, as shown dotted in Figure 1.

On the pintle 8 of the knuckles 9 of said hinge is the spring 10 whose ends engage the respective leaves of the hinge whereby the handle will be held elevated and so raised above the top plate of the range, stove or other heating medium on which the vessel is placed for boiling or cooking purposes.

On the lower end of the handle 3 is mounted pivotally the dog 11 which is provided with the nose 12, the latter passing through the opening 13 in the adjacent end of the bar 3 and being adapted to engage with the inner wall of said opening thus locking said lower end of the handle with said bar, and consequently securing it to the body 1 of the vessel.

The dog 11 is provided with an operating handle or knob 14 and it is engaged by the spring 15, which is seated on the handle 2 and bears against said dog whereby the latter is held in firm engagement with the bar 3. In the upper portion of the outer side of the handle 2 is the recess 16 which when the handle is elevated is adapted to allow the hinge of the cap 17 of the body 1 to occupy said recess whereby the handle may rest on said cap or top as a support therefor in its elevated position and so limit the forward motion of said handle when thus elevated, while the handle is steadied on said cap or top.

It will be seen that as the upper end of the handle is connected with the body 1 by the hinge 7, and its lower end is connected with said body by the dog 11, the body may be readily carried by said handle and placed upon a range, stove, etc., for boiling or cooking purposes. Then the dog 11 is released from the body when the handle is elevated and held so by the action of the spring 10 of the hinge 7 and thus the handle is removed from the direct action of the heat of the range, stove, etc., and so it is not materially affected by the same, the same being true of the dog 11, so that the latter will not be burned off or loosened. When the boiling or cooking is effected, the handle is lowered when the nose of the dog snaps on the bar 3 and so as the handle is engaged at both ends with the body 1 it is firmly connected with the latter as one, and so the vessel may be removed from the range, stove, etc., by the handle without wabbling of the body and looseness of the handle and body one on the other.

Having thus described my invention what I claim as new and desire to secure by Letters Patent, is:—

1. An article of the character stated, comprising a receptacle, a vertically arranged plate fixed to said receptacle, a handle pivoted to said plate and arranged for movement in an arc of a circle toward the receptacle top, means for supporting said handle in raised position, and means for detachably securing the lower part of said handle with the lower part of said plate.

2. An article of the character stated, comprising a receptacle, a vertically arranged plate fixed to said receptacle, a handle pivoted to said plate and arranged for movement in an arc of a circle toward the receptacle top, means including a spring for supporting said handle in raised position, and means for detachably securing the lower part of said handle with the lower part of said plate.

3. An article of the character stated, comprising a receptacle, a vertically arranged plate fixed to said receptacle, a handle pivoted to said plate and arranged for movement in an arc of a circle toward the receptacle top, means for supporting said handle in raised position, and means including a spring pressed catch for detachably securing the lower part of said handle with the lower part of said plate.

4. An article of the character stated, comprising a receptacle, a vertically arranged plate removably fixed to said receptacle, a handle pivoted to said plate and arranged for movement in an arc of a circle toward the receptacle top, means including a spring for supporting said handle in raised position, and means including a spring pressed catch for detachably securing the lower part of said handle with the lower part of said plate.

FREDERICK W. HECHLER.

Witnesses:
GEORGE J. SYMS,
EDWARD F. TAYLOR.